Jan. 14, 1964  G. R. BAHR ETAL  3,117,871
PACKAGED PEANUT BUTTER PRODUCT AND METHOD OF MAKING THE SAME
Filed June 7, 1961
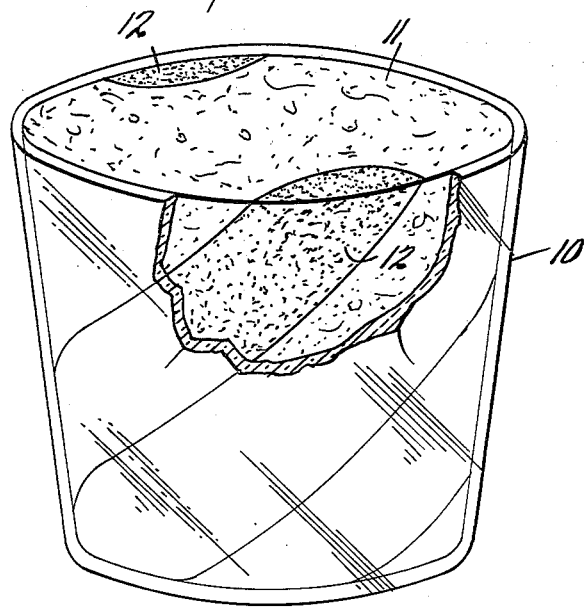
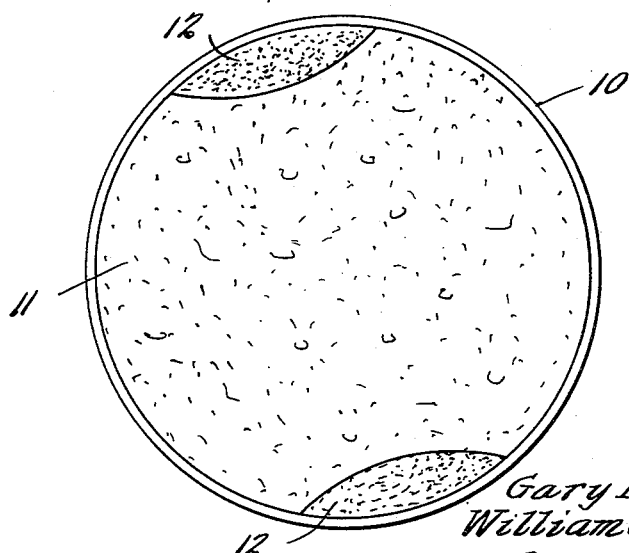
INVENTORS
Gary R. Bahr
William C. Krumrei,
BY
ATTORNEY

United States Patent Office 3,117,871
Patented Jan. 14, 1964

3,117,871
PACKAGED PEANUT BUTTER PRODUCT AND
METHOD OF MAKING THE SAME
Gary R. Bahr, Greenhills, and William C. Krumrei,
Wyoming, Ohio, assignors to The Procter & Gamble
Company, Cincinnati, Ohio, a corporation of Ohio
Filed June 7, 1961, Ser. No. 115,337
6 Claims. (Cl. 99—128)

This invention relates to a new food product. More particularly, it relates to a mixture of peanut butter and a sweetening composition, and to methods for making such new food product.

Many persons enjoy eating peanut butter combined with various other foods. Such foods frequently contain substantial amounts of moisture, for example, jelly, jam, preserves, and marshmallow. These aqueous food-peanut butter mixtures are prepared a short time prior to consumption. This necessitates opening a container of peanut butter and another container of an aqueous food, such as jam, and removing from each container a portion of food. Furthermore, it is ordinarly extremely difficult and inconvenient to determine the proper proportion of peanut butter to aqueous food required to obtain a mixture possessing the desired consistency and taste.

Therefore, it would clearly be advantageous to the consumer if peanut butter and aqueous food were mixed in proper proportions in the same container. However, it is not commercially feasible to do so, because during the normal storage period—even after as short a period as a few days at room temperature—the mixture becomes dark, sticky and unfit for human consumption.

Workers in the art generally believe this undesirable chemical and physical change in the aqueous food-peanut butter mixture to be the result of the well-known Maillard-type browning reaction. This reaction is believed to be a reaction of amino acid with carbohydrate—both reactants being present in peanut butter—and to be initiated by moisture.

It is an object of this invention to provide a simulative aqueous food-peanut butter mixture which does not undergo undesirable chemical and/or physical change during the normal marketing and culinary storage period.

It is a further object to provide a new food product having outstandingly desirable culinary characteristics in addition to excellent simulative characteristics.

A still further object is to provide a simulative food product which can be more conveniently prepared for consumption than can the aqueous food-peanut butter mixture which is simulated.

Yet another object is to provide a simulative food product which demonstrates properties, such as consistency and taste, tending to be more uniformly desirable than those properties normally possessed by the aqueous food-peanut butter mixture which is simulated.

Further objects and advantageous features will be apparent from the following detailed description and from the drawings in which:

FIGURE 1 is an elevation showing a transparent, uncovered container containing a substantially non-intimate mixture of peanut butter and a sweetening composition; and FIGURE 2 is a plan view of the container and contents of FIGURE 1.

In general, the present invention is based upon the discovery that a new food product which fulfills all of the aforementioned objectives can be prepared by combining the peanut butter with a sweetening composition comprising an intimate mixture of edible plastic fat, sugar and flavoring material, the weight ratio of fat to sugar being within the range of from about 3:7 to about 7:3.

Briefly, the method for preparing the food product of this invention comprises the steps of: intimately admixing edible plastic fat, sugar and flavoring material and then non-intimately combining the resulting sweetening composition with peanut butter.

The sweetening composition and peanut butter can be combined in a container in such a manner as to form a definite configuration. The means for so disposing the two compositions may consist of the simultaneous extrussion of the individual compositions from separate dispensers into a container, as is well known in the ice cream art, or it may consist of simple alternate addition of the compositions. Simultaneous extrusion is the preferred means of the present invention. Such a means can be utilized to obtain a food product as shown in FIGURES 1 and 2 of the drawings, wherein 10 represents a transparent container. The peanut butter is represented by the reference numeral 11, and the sweetening composition by the reference numeral 12.

Various types of conventional mixing means, such as table mixers, ribbon blenders or scraped wall mixers, are suitable for mixing the ingredients of the sweetening composition so long as they provide for the formation of a substantially homogeneous mixture. Operating such means at a relatively high rate of speed permits the aeration of the composition. However, it is to be understood that the invention is not to be limited to any particular means, or to an aerated composition.

It is essential to the successful practice of this invention that the fat and sugar constituents of the sweetening composition be employed within the aforementioned ratio range. Employing fat in a proportion exceeding the 7:3 ratio of fat to sugar results in a sweetening composition having an undesirable flavor and texture; whereas, employing sugar in a proportion exceeding the 3:7 ratio of fat to sugar gives a lumpy composition lacking the creamy consistency obtained when a proper ratio of fat to sugar is utilized.

Moreover, in order to obtain a sweetening composition which at ordinary temperatures, such as room temperature, is substantially non-flowable, yet spreadable, requires that the fat have a penetration value within the range of from about 230 to about 320, said penetration values being measured as hereinafter described. If a fat having a penetration value greater than about 320 is used, the sweetening composition is flowable to an undesirably high degree; whereas, a fat having such a value less than about 230 is undesirably rigid.

The penetration values referred to herein are obtained by the following procedure: The fat is tempered at 85° F. for 48 hours and then stored at 70° F. for at least 24 hours. A container of the fat is placed under the needle of a penetrometer, the distance from the point of the needle to the surface of the fat being 2 cm. The diameter of the 2-inch long conical-shaped needle increases from a point of $\frac{1}{32}$ inch in diameter to a base of $\frac{19}{32}$ inch in diameter. The needle is attached to a steel shaft with collars, the total weight of the needle, shaft and collars being 47 gms. With the temperature of the room and fat kept constant at 70° F. the needle is permitted to drop the 2 cm. distance, the point of the needle penetrating the surface of the fat, and to settle in the fat for 10 seconds. The depth to which the needle penetrates the fat is read on the dial of the penetrometer, each scale division of the dial being equivalent to 0.1 mm. Several penetrations are taken and the average of the penetrations is recorded as the penetration value.

The type of edible plastic fat employed in this invention is not critical. Any of the well-known edible plastic fats derived from animal, vegetable and marine sources, such as are used in shortening, are satisfactory. For example, the fat can comprise vegetable oil hydrogenated to provide desired keeping quality and plasticity. Suitable fats can also include various blends of hydrogenated and unhydrogenated vegetable and animal fats. Plastic fats can also be prepared by interesterification of one or more animal or vegetable fats and oils to provide desired properties. A part or all of the fat can be glycerides in which one or more of the hydroxyl groups of the glycerine is esterified with a short-chain fatty acid instead of long-chain fatty acids. A more complete description of various types of fats commonly used in the manufacture of shortenings can be found in "Industrial Oil and Fat Products," A. F. Bailey, 2d Edition, pages 234 to 257 and 755 to 758.

Although the advantages of this invention can be realized by employing any of the well-known sugars, such as sucrose, lactose and glucose, or mixtures of sugars, in the preferred practice of the invention a pulverulent mixture of sucrose, dextrose and corn syrup solids is employed.

Since an important object of this invention is to provide a new food product which simulates a fruit spread-peanut butter combination, or a marshmallow-peanut butter combination, it is preferable to give the sweetening composition a fruit or vanilla flavor. Commercially available edible flavoring materials both natural and synthetic, are suitable for this purpose. Of course, flavors other than fruit and vanilla can be used.

If it is desired that the sweetening composition is to be given a fruit flavor, a small proportion of citric acid may serve to enhance such flavor.

The sweetening composition can also contain minor proportions of other ingredients, for example, salt and coloring. However, such ingredients should not be regarded as essential.

Furthermore, various substances, such as starch, lactose, dried milk solids, or mixtures thereof, can be employed as fillers.

It is preferred practice to include about 1.5% water by weight, based on the weight of the sweetening composition, in order to obtain a smoother consistency. Yet, the use of water is not required. Since, as was discussed above, the presence of water is believed to be necessary to initiate the browning reaction, the amount of water which can be employed must be carefully controlled. It has been discovered that the presence of up to about 6% moisture by weight, based on the weight of the sweetening composition, does not initiate the undesired browning reaction under normal marketing and culinary storage conditions, but that the presence of more than about 6% moisture by weight does initiate this reaction.

It will be noted that the use of the term "peanut butter" herein is intended to include all spreadable food compositions which contain a significant amount of ground peanuts. In addition to components naturally present in peanuts, the peanut butter can also contain partially or substantially saturated glyceride fats or combinations of fats and oils added to provide the proper plasticity, sugar, honey, corn syrup or other sweetening agents, and minor amounts of salt and other additives.

Furthermore, it is evident that the sweetening composition of this invention can be combined with spreads or butters made from nuts other than the peanut, and also with other foods, particularly those of a confectionary nature.

The ratio in which the sweetening composition and the peanut butter should be admixed is dependent upon a variety of factors. Of primary consideration is taste. Other factors remaining constant, the relative distinctiveness and intensity of the flavor employed is largely determinative of this question. Obviously, the desired configuration to be formed in the container, as hereinbefore described, is also an important consideration. If the sweetening composition is given a fruit or vanilla flavor, a ratio of sweetening composition to peanut butter within the range of from about 3:7 to about 7:3 is satisfactory.

The following examples are illustrative of the invention; all amounts being expressed as parts by weight unless otherwise specified.

Example I

| | Parts |
|---|---|
| Blend of partially hydrogenated soybean and cottonseed oils (penetration value of 260) | 50.0 |
| Sucrose (pulverulent) | 49.3 |
| Vanilla flavor (artificial, containing 0.1 part water) | 0.2 |
| Salt | 0.5 |

The fat was placed in a conventional table mixer. During mixing the pulverulent sucrose was first added to the fat, then the flavor and salt were added. After mixing the above ingredients until a smooth and creamy consistency was obtained, the speed of the mixer was increased in order to aerate the mixture to such an extent that it comprised 10% by volume of air.

70 parts of a commercially available peanut butter and 30 parts of the aerated mixture were then non-intimately mixed by simultaneous extrusion into a container, the two constituents being disposed so as to form a spiral configuration. The appearance of the finished food product is represented by FIGURES 1 and and 2, wherein the peanut butter is represented by the reference numeral 11 and the aerated mixture is represented by the reference numeral 12.

The product was stored at a temperature of 70° F. for a period of more than 1 year, after which storage period it was examined and found to have undergone substantially no undesirable physical or chemical change. It had excellent eating qualities.

Example II

| | Parts |
|---|---|
| Blend of partially hydrogenated soybean and cottonseed oils (penetration value of 260) | 50.00 |
| Sucrose (pulverulent) | 48.66 |
| Raspberry flavor (artificial) | 0.40 |
| Citric acid (50% alcohol solution) | 0.04 |
| Salt | 0.30 |
| Red color | 0.60 |

The above ingredients, in the proportions specified, were mixed and aerated (10% by volume air) as described in Example I.

70 parts of a commercially available peanut butter and 30 parts of the aerated mixture were then non-intimately mixed by the method employed in Example I to give a final product having substantially the same satisfactory qualities as the final product prepared in Example I.

Example III

| | Parts |
|---|---|
| Blend of partially hydrogenated soybean and cottonseed oils (penetration value of 260) | 70.00 |
| Sucrose (pulverulent) | 30.00 |

The above ingredients, in the proportions specified, were mixed and aerated (10% by volume air) in the same way as described in Example I.

Sixty-four parts of a commercially available peanut butter and 36 parts of the aerated mixture were then non-intimately mixed by the method employed in Example I to give a final product having a spiral configuration similar to the final product prepared in Example I, and excellent eating qualities.

Example IV

| | Parts |
|---|---|
| Partially hydrogenated soybean oil (penetration value of 260) | 30.00 |
| Sucrose (pulverulent) | 70.00 |

The above ingredients, in the proportions specified, were mixed and aerated (10% by volume air) in the same way as described in Example I.

Fifty parts of a commercially available peanut butter and 50 parts of the aerated mixture were then non-intimately mixed by the method employed in Example I to give a final product having a spiral configuration similar to the final product prepared in Example I, and excellent eating qualities.

*Example V*

| | Parts |
|---|---|
| Partially hydrogenated soybean oil (penetration value of 260) | 58.5 |
| Sugar mixture (15 parts dextrose, 15 parts corn syrup solids, and 9.3 parts sucrose—pulverulent) | 39.3 |
| Salt | 0.5 |
| Vanilla flavor (artificial) | 0.2 |
| Water | 1.5 |

The fat is placed in a conventional table mixer. During mixing the pulverulent sugar mixture is first added to the fat, then the salt, flavor and water is added. After mixing the above ingredients until a smooth and creamy consistency is obtained, the speed of the mixer is increased in order to aerate the mixture to such an extent that it comprises 10% by volume of air.

Seventy parts of a commercially available peanut butter and 30 parts of the aerated mixture are then non-intimately mixed by simultaneous extrusion into a container, the two constituents being disposed so as to form a spiral configuration. The appearance of the finished food product is represented by FIGURES 1 and 2, wherein the peanut butter is represented by the reference numeral 11 and the aerated mixture is represented by the reference numeral 12, both being in transparent container 10.

*Example VI*

| | Parts |
|---|---|
| Partially hydrogenated soybean oil (penetration value of 235) | 56.0 |
| Sucrose (pulverulent) | 38.3 |
| Vanilla flavor (artificial) | 0.2 |
| Water | 5.5 |

The fat is placed in a conventional table mixer. During mixing the pulverulent sugar, flavor and water are added. The speed of the mixer is not increased in order to obtain aeration.

Thirty parts of a commercially available peanut butter and 70 parts of the sweetening mixture are then non-intimately mixed by the method employed in Example I to give a final product having substantially the same appearance and desirable eating qualities as the final product prepared in Example I.

Partially hydrogenated soybean oil having a penetration value of 315 can be substituted in the above formulation with comparable results.

The products of all of the above examples will exhibit significant stability on storage.

What is claimed is:

1. A packaged edible product resistant to chemical and physical change, comprising a non-intimate combination of peanut butter and a sweetening composition, and a container therefore, said peanut butter and said sweetening composition having substantially non-flowable consistency and being disposed in separate masses, unmixed each with the other, within the container, the ratio of sweetening composition to peanut butter being within the range of from 3:7 to about 7:3, said sweetening composition comprising an intimate substantially homogeneous mixture of edible plastic fat having a penetration value within the range of from about 230 to about 320; flavor; sugar selected from the group consisting of sucrose, glucose, dextrose, lactose, corn syrup solids, and mixtures thereof, the weight ratio of fat to sugar being within the range of from about 3:7 to about 7:3; and not more than 6% moisture by weight, based on the weight of the sweetening composition.

2. The product of claim 1 wherein the sweetening composition is aerated.

3. The process of making a packaged edible product resistant to chemical and physical change which comprises introducing into a container, in separate masses, unmixed each with the other, peanut butter and a sweetening composition, the ratio of peanut butter to sweetening composition being within the range of from about 3:7 to about 7:3, said sweetening composition comprising an intimate substantially homogeneous mixture of edible plastic fat having a penetration value within the range of from about 230 to about 320; flavor; sugar selected from the group consisting of sucrose, glucose, dextrose, lactose, corn syrup solids, and mixtures thereof, the weight ratio of fat to sugar being within the range of from about 3:7 to about 7:3; and not more than 6% moisture by weight, based on the weight of the sweetening composition.

4. The method according to claim 3 wherein the peanut butter and the sweetening composition are simultaneously extruded into the container from separate sources.

5. The method according to claim 3 wherein masses of peanut butter and sweetening composition are alternately added to the container.

6. The method according to claim 3 wherein the sweetening composition is aerated.

References Cited in the file of this patent

UNITED STATES PATENTS

| 1,696,766 | Howe | Dec. 25, 1928 |
| 2,079,288 | Hoffman | May 4, 1937 |
| 2,521,243 | Mitchell | Sept. 5, 1950 |